United States Patent
Hori et al.

(10) Patent No.: US 7,081,063 B2
(45) Date of Patent: Jul. 25, 2006

(54) INTERNAL PLANETARY GEAR MECHANISM

(75) Inventors: Masashi Hori, Nukata-gun (JP);
Masamichi Watanabe, Kariya (JP);
Akihiko Takenaka, Anjo (JP);
Takahisa Yokoyama, Anjo (JP);
Takayuki Takeshita, Anjo (JP); Yuzo Imoto, Chita-gun (JP)

(73) Assignees: Denso Corp., Kariya (JP); Nippon Soken, Inc., Nishio (JP); ADVICS Co., Ltd., Kariya (JP)

( * ) Notice: Subject to any disclaimer, the term of this patent is extended or adjusted under 35 U.S.C. 154(b) by 155 days.

(21) Appl. No.: 10/928,734

(22) Filed: Aug. 30, 2004

(65) Prior Publication Data

US 2005/0059524 A1   Mar. 17, 2005

(30) Foreign Application Priority Data

Aug. 29, 2003   (JP) .............................. 2003-306684

(51) Int. Cl.
*F16H 1/32* (2006.01)

(52) U.S. Cl. ...................... 475/180; 475/344
(58) Field of Classification Search ............. 475/180, 475/344, 904; 74/462, 437
See application file for complete search history.

(56) References Cited

U.S. PATENT DOCUMENTS

| 3,165,943 | A | * | 1/1965 | Sundt ........................ 74/498 |
| 4,922,781 | A | * | 5/1990 | Peiji .......................... 74/462 |
| 5,226,798 | A | * | 7/1993 | Eisenmann ................. 418/109 |
| 5,429,556 | A | * | 7/1995 | Ishida et al. ................ 475/180 |
| 5,707,310 | A | * | 1/1998 | Maeguchi et al. .......... 475/180 |

FOREIGN PATENT DOCUMENTS

JP       07243486 A  *  9/1995

* cited by examiner

*Primary Examiner*—Rodney H. Bonck
*Assistant Examiner*—Justin K. Holmes
(74) *Attorney, Agent, or Firm*—Nixon & Vanderhye P.C.

(57) ABSTRACT

An internal planetary gear mechanism reduces a load applied to tooth surfaces of an external gear and an internal gear, a sliding portion such as a bearing and the like. By setting the amount of eccentricity $\alpha$ of an eccentric part to be larger than a theoretical value, a distance between the center of the external gear and the center of the internal gear is increased to allow the reduction of a loss in the bearing and on the tooth surfaces of the gears, and a mesh zone between the internal gear and the external gear can be reduced to decrease a part at a large pressure angle, thereby reducing a loss generated by a large pressure angle. As a result of reduction in the mesh zone between the external gear and the internal gear, rolling contact of the gears is maintained.

13 Claims, 11 Drawing Sheets

PITCH CIRCLE $\Delta x + \Delta y$

FIG. 11

PITCH CIRCLE OF EXTERNAL GEAR

PITCH CIRCLE OF INTERNAL GEAR $(\Delta x + \Delta y)/2$

ENLARGED VIEW OF A: 0 DEGREE

FIG. 17B

ENLARGED VIEW OF B: 30 DEGREES

FIG. 17C

ENLARGED VIEW OF C: 60 DEGREES

FIG. 17D

ENLARGED VIEW OF D: 90 DEGREES

FIG. 17E

ENLARGED VIEW OF E: 120 DEGREES

INTERNAL PLANETARY GEAR MECHANISM

CROSS REFERENCE TO RELATED APPLICATIONS

This application is based upon, claims the benefit of priority of, and incorporates by reference Japanese Patent Application No. 2003-306684 filed Aug. 29, 2003.

BACKGROUND OF THE INVENTION

1. Field of the invention

The present invention relates to an internal planetary gear mechanism used in a reduction gear or an overdrive gear, and in particular, to the amount of eccentricity α of an internal gear.

2. Description of the Related Art

The amount of eccentricity α of an internal gear in a conventional internal planetary gear mechanism is set to a theoretical value expressed by: (module)×0.5×(difference in number of teeth between the internal gear and an external gear).

More specifically, the theoretical value is expressed by:

$$(\phi D1/N) \times 0.5 \times (M-N)$$

where M is the number of teeth of the internal gear, N is the number of teeth of the external gear, and φD1 is a diameter of a pitch circle of the external gear. The amount of eccentricity α is conventionally set to the thus obtained theoretical value (for example, see Japanese Patent Laid-Open Publication No. Hei 7-243486).

(a') During the operation of the internal gear and the external gear, the center of the external gear acts so as to oscillate with respect to the internal gear. As a result, the external gear acts so as to be pushed in the oscillating direction.

Since a rotational torque is expressed by: (turning radius)×(force), a force in the oscillating direction can be reduced more as a distance between the center of the external gear and the center of the internal gear is increased. As a result, a load applied to a bearing, which is provided between an eccentric part and the external gear, and a load (surface pressure) generated on meshing tooth surfaces of the internal gear and the external gear, can be reduced.

Since a loss can be expressed by: (coefficient of friction)×(load)×(velocity), the loss can be reduced by decreasing the load. However, since the amount of eccentricity α is set to the theoretical value in a conventional internal planetary gear mechanism, it is impossible to increase the distance between the center of the external gear and the center of the internal gear to reduce the load on the bearing or the tooth surfaces of the gears without increasing the size of the internal planetary gear mechanism.

(b') The conventional internal planetary gear mechanism, in which the amount of eccentricity α is set to the theoretical value, has a large mesh zone between the internal gear and the external gear, thereby transmitting a turning force with a large number of tooth surfaces. Therefore, a mesh angle (pressure angle) is increased when coming closer to the ends of the mesh zone.

The turning force with respect to the force applied to the gears can be obtained by the following expression:

(force applied to the gears)×cos(pressure angle)

More specifically, as the pressure angle increases, a larger amount of the applied force becomes a loss instead of being a turning force. Thus, since the conventional internal planetary gear mechanism has a large mesh zone and thus has a large mesh part at a large pressure angle, a transmission loss of the turning force is increased.

(c') The internal gear and the external gear are in contact with each other in such a way that their mesh points shift while they are sliding within the mesh zone during the operation.

However, since the conventional internal planetary gear mechanism has a large mesh zone and thus has a large slide contact area, a loss due to slide contact disadvantageously increases. More specifically, the number of positions where a loss is generated by slide contact is large to increase a transmission loss of the turning force.

Moreover, since slide contact occurs while a large load is being applied on the tooth surfaces of the respective gears, a large abrasion is caused on the tooth surfaces on which the slide contact occurs. In order to cope with this problem, the gears are quenched, which induces, however, a strain in the gears.

SUMMARY OF THE INVENTION

The present invention has been devised in view of the above problems, and has an object of providing an internal planetary gear mechanism having improved mechanical efficiency as well as improved endurance of gears, which is achieved by intentionally increasing the amount of eccentricity α of an internal gear to be larger than a theoretical value so as to reduce a load (surface pressure/force) generated on meshing tooth surfaces of the internal gear and an external gear and a load applied to a sliding portion such as a bearing.

In an internal planetary gear mechanism according to a first aspect of the present invention, the amount of eccentricity a of an eccentric part is set to be larger than a theoretical value. By setting the amount of eccentricity α in this manner, the following effects can be obtained.

(a) By setting the amount of eccentricity α to be larger than a theoretical value, a distance between the center of an external gear and the center of an internal gear can be increased without increasing the size of the internal planetary gear mechanism. As a result, during the operation of the internal gear and the external gear, a force applied in the direction, in which the center of the external gear oscillates with respect to the internal gear, is reduced to decrease the load on a bearing and the load (surface pressure) generated on meshing tooth surfaces of the internal gear and the external gear.

Since a loss is expressed by: (friction coefficient)×(load)×(velocity), a load can be reduced to decrease a loss on the bearing and a loss generated on the meshing tooth surfaces of the gears.

(b) By setting the amount of eccentricity α to be larger than the theoretical value, a mesh zone between the internal gear and the external gear is reduced as compared with a conventional case. Thus, an area at a large mesh angle (pressure angle) between the internal gear and the external gear can be reduced.

Since the turning force with respect to the force applied to the gears is obtained by:

(force applied to the gears)×cos(pressure angle), the area at a large mesh angle can be reduced. As a result, a loss generated due to a large pressure angle can be decreased.

More specifically, as a result of the reduction of the mesh zone, a loss generated due to a large pressure angle can be reduced to decrease a transmission loss of the turning force.

(c) By setting the amount of eccentricity α to be larger than the theoretical value, the mesh zone between the internal gear and the external gear is reduced as compared with a conventional case. As a result, a contact form between the internal gear and the external gear transits from slide contact to rolling contact, thereby reducing the slide contact. As a result, a loss due to slide contact can be reduced to decrease a transmission loss of the turning force. Moreover, since the slide contact is reduced, an abrasion on the tooth surfaces due to slide contact can be prevented from being caused to improve the endurance life of the gears.

Tooth profiles of the external gear and the internal gear of the internal planetary gear mechanism according to a second aspect of teachings of the invention are configured such that the tooth profile inside a pitch circle is provided by a hypocycloid curve and the tooth profile outside the pitch circle is provided by an epicycloid curve. By providing the tooth profiles in this manner, the pressure angle can be reduced to enhance the transmission efficiency.

In the following description,

N is the number of teeth of the external gear,

φD1 is a diameter of the pitch circle of the external gear,

M is the number of teeth of the internal gear,

φD2 is a diameter of the pitch circle of the internal gear,

φD1H is a diameter of a rolling circle for tracing a hypocycloid curve for forming a tooth profile curve of the external gear, φD1E is a diameter of a rolling circle for tracing an epicycloid curve for forming a tooth profile curve of the external gear, φD2H is a diameter of a rolling circle for tracing a hypocycloid curve for forming a tooth profile curve of the internal gear, and φD2E is a diameter of a rolling circle for tracing an epicycloid curve for forming a tooth profile curve of the internal gear.

The internal planetary gear mechanism according to a third aspect of teachings of the invention is configured such that a part of the tooth profile of the external gear, which is given by the hypocycloid curve, is provided with a recess having an increasing width in an inner diameter direction from the pitch circle for tracing the hypocycloid curve.

The internal planetary gear mechanism according to a fourth aspect of teachings of the invention is configured such that a part of the tooth profile of the internal gear, which is given by the epicycloid curve, is provided with a recess having an increasing width in an outer diameter direction from the pitch circle for tracing the epicycloid curve.

According to the third or fourth aspect of teachings of the invention, an abrasion loss due to contact of a tooth top, which does not contribute to torque transmission, can be assuredly prevented. Moreover, since the recesses can also be used as grease cups, grease can be prevented from running short. Since the epicycloid curve and the hypocycloid curve can be smoothly connected, stress concentration due to contact of a projecting portion can be alleviated to prevent the partial abrasion of the tooth surface.

The internal planetary gear mechanism according to a fifth aspect of teachings of the invention satisfies the relationship:

$$\phi D1/N = \phi D2/M.$$

The internal planetary gear mechanism according to a sixth aspect of teachings of the invention satisfies the relationships:

$$\phi D1H > \phi D1E; \text{ and } \phi D1H + \phi D1E = \phi D1/N.$$

By satisfying the above relationships in this manner, a clearance is formed for the external gear so as to avoid the interference with the internal gear.

The internal planetary gear mechanism according to a seventh aspect of teachings of the invention satisfies the relationships: $\phi D2H < \phi D2E$; and $\phi D2H + \phi D2E = \phi D2/M$. By satisfying the above relationships in this manner, a clearance is formed for the internal gear so as to avoid the interference with the external gear.

The internal planetary gear mechanism according to an eighth aspect of teachings of the invention satisfies the relationships:

$$\phi D1H > \phi D1E;$$

$$\phi D1H + \phi D1E = D1/N;$$

$$\phi D2H < \phi D2E;$$

$$\phi D2H + \phi D2E = \phi D2/M;$$

$$\phi D1H = \phi D2E; \text{ and}$$

$$\phi D1E = \phi D2H.$$

By satisfying the above relationships, clearances are formed for both the external gear and the internal gear, respectively, so as to avoid the interference between the external gear and the internal gear.

Anti-rotation means of the internal planetary gear mechanism according to a ninth aspect of teachings of the invention has a plurality of inner pin holes provided on the same circumference on a member whose rotation is regulated (for example, a housing, a flange connected to an output shaft so as to regulate its rotation, and the like), and a plurality of inner pins provided on the same circumference on the external gear, each being inserted into each of the inner pin holes with a play so that its one end is secured to the external gear.

Anti-rotation means of the internal planetary gear mechanism according to a tenth aspect of teachings of the invention has a plurality of inner pin holes provided on the same circumference on the external gear, a plurality of inner pins provided on the same circumference on a member whose rotation is regulated, each being inserted into each of the inner pin holes with a play so that its one end is secured to the member whose rotation is regulated.

In the internal planetary gear mechanism according to an eleventh aspect of teachings of the invention, a diameter φDPCD-hole of a pitch circle for forming the plurality of inner pin holes is set equal to a diameter φDPCD-pin of a pitch circle for forming the plurality of inner pins. In the internal planetary gear mechanism according to a twelfth aspect of teachings of the invention, the plurality of inner pin holes are provided at equiangular intervals for the pitch circle for forming the inner pin holes. At the same time, the plurality of inner pins are provided at equiangular intervals for the pitch circle for forming the plurality of inner pins.

In the internal planetary gear mechanism according to a third aspect of teachings of the invention, a diameter φDhole of the inner pin hole is set equal to or larger than the sum of the amount of eccentricity α of the eccentric part and a diameter φDpin of the inner pin. By setting the values as described above, the dimensional relationship of the inner pin diameter φDpin and the inner pin hole diameter whole with respect to the amount of eccentricity α can be optimized, thereby preventing a torque ripple due to a twist generated between the inner pin and the inner pin hole.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings,.wherein.

DETAILED DESCRIPTION OF THE PREFERRED EMBODIMENTS

The following description of the preferred embodiments is merely exemplary in nature and is in no way intended to limit the invention, its application, or uses.

According to a first preferred embodiment, in an internal planetary gear mechanism in which a tooth profile of each of an external gear and an internal gear is provided by a cycloid curve, the amount of eccentricity α of an eccentric part is set to be larger than a theoretical value. According to a second preferred embodiment, in an internal planetary gear mechanism in which a tooth profile of each of an external gear and an internal gear is provided so that a tooth profile inside a pitch circle is provided by a hypocycloid curve whereas a tooth profile outside the pitch circle is provided by an epicycloid curve, the amount of eccentricity α of an eccentric part is set to be larger than a theoretical value.

Embodiment 1

Figure 1:
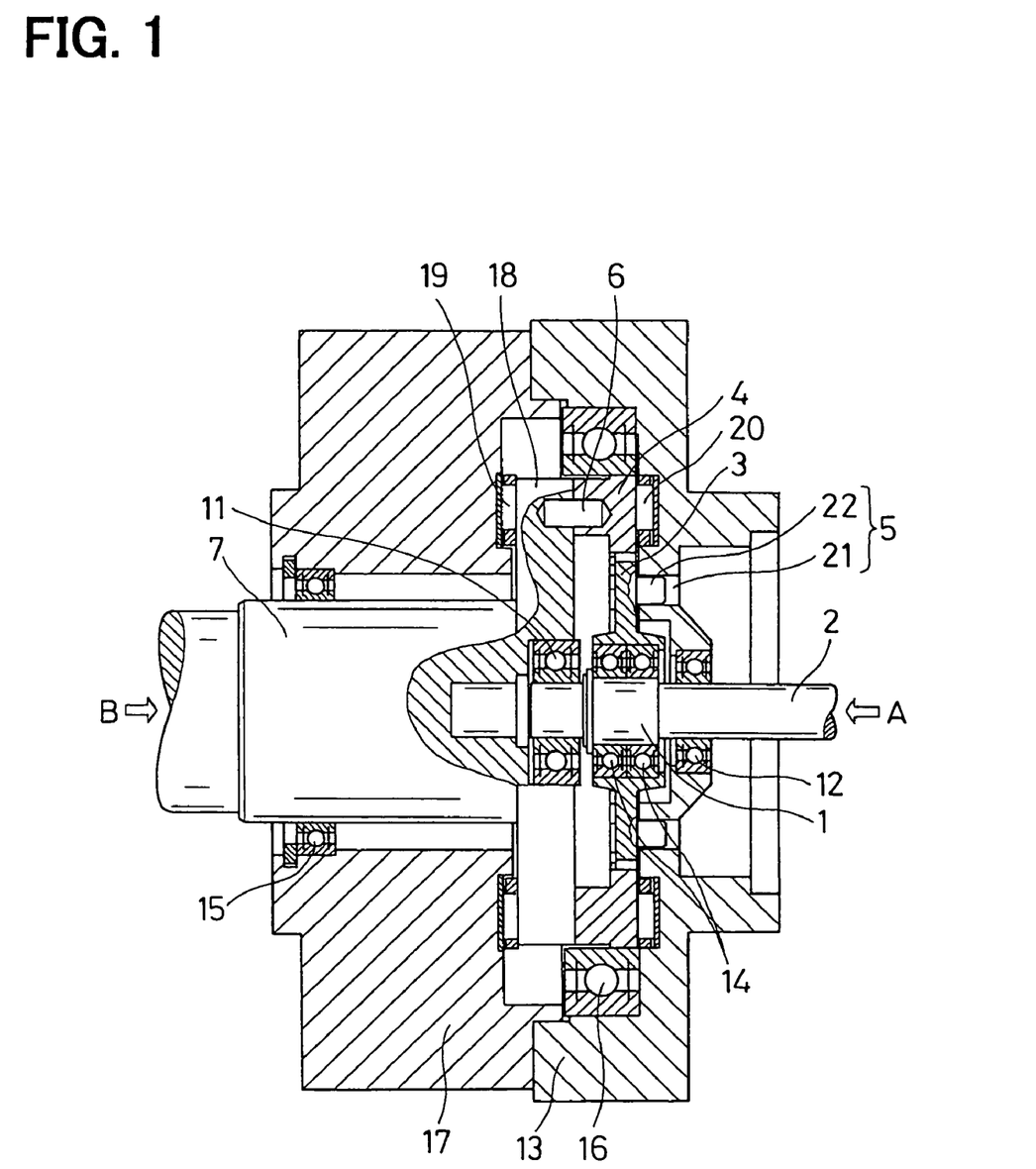
FIG. 1 is a cross-sectional view of an internal planetary gear mechanism.

An internal planetary gear mechanism, to which teachings of the present invention are applied, will be described with reference to FIGS. 1 to 17. In this first Embodiment, the left side in FIG. 1 is referred to as the front and the right side is referred to as the rear, for convenience.

First, a schematic structure of the internal planetary gear mechanism will be described with reference to FIGS. 1 to 5. The internal planetary gear mechanism according to Embodiment 1 is used as a reduction gear. The internal planetary gear mechanism includes a first shaft 2 provided with an eccentric part 1, an external gear 3 rotatably provided around the eccentric part 1 through a bearing (a third roller bearing 14 described below), an internal gear 4 in internal mesh with the external gear 3, anti-rotation means 5 for regulating an rotational operation of the external gear 3, and a second shaft 7 connected to the internal gear 4 through a knock pin 6.

If the internal planetary gear mechanism is used as a reduction gear, the first shaft 2 serves as an input shaft which is rotatably supported by a first roller bearing 11 provided on its one end, a first end, on the front side and a second roller bearing 12 provided on the other end, a second end, on the rear side. The first roller bearing 11 is supported inside the rear end of the second shaft 7, whereas the second roller bearing 12 is supported by a rear housing 13.

The eccentric part 1 provided for the first shaft 2 is an eccentric shaft which eccentrically rotates with respect to the center of a pitch circle of the internal gear 4 (co-axially with the centers of the first shaft 2 and the second shaft 7) so as to oscillate and rotate the external gear 3. The eccentric part 1 rotatably supports the external gear 3 through a third roller bearing 14 provided around the outer circumference of the eccentric part 1.

If the internal planetary gear mechanism is used as a reduction gear, the second shaft 7 serves as an output shaft which is rotatably supported by a fourth roller bearing 15 and a fifth roller bearing 16.

The fourth roller bearing 15 is supported by a front housing 17. The fifth roller bearing 16 is supported by the rear housing 13 so as to rotatably support the internal gear 4. Since the internal gear 4 is connected to a flange 18 provided on the end of the second shaft 7 on the rear side through the knock pin 6, the rear side of the second shaft 7 is supported by the fifth roller bearing 16 through the internal gear 4.

In front and the rear of the flange 18 and the internal gear 4 which are connected to each other, a first thrust bearing 19 and a second thrust bearing 20 are respectively provided so as to regulate the position of the connected flange 18 and internal gear 4 in a front-rear direction.

As described above, the external gear 3 is rotatably supported through the third roller bearing 14 with respect to the eccentric part 1 of the first shaft 2. The external gear 3 is configured so as to be rotated by the rotation of the eccentric part 1 while being pushed against the internal gear 4. Additionally, the internal gear 4 is connected to the flange 18 of the second shaft 7 through the knock pin 6 so as to rotate cooperatively with the second shaft 7.

The anti-rotation means 5 is configured to include a plurality of inner pin holes 21 provided on the same circumference on the rear housing 13 (corresponding to a member whose rotation is regulated), and a plurality of inner pins 22 provided on the same circumference on the external gear 3, each being inserted into each of the inner pin holes 21 with a play so that its one end is secured to the external gear 3.

Contrary to this first embodiment, the anti-rotation means 5 may be configured to include the plurality of inner pin holes 21 provided on the same circumference on the external gear 3, and the plurality of inner pins 22 provided on the same circumference on the rear housing 13, each being inserted into each of the inner pin holes 21 with a play so that its one end is secured to the rear housing 13.

The plurality of inner pins 22 are provided on the rear surface of the external gear 3 so as to protrude toward the rear side. The plurality of inner pin holes 21 are formed through an inner wall face of the rear housing 13 on the front side and are configured to regulate the rotational operation of the external gear 3 by engagement between the inner pins 22 and the inner pin holes 21.

Figure 6:
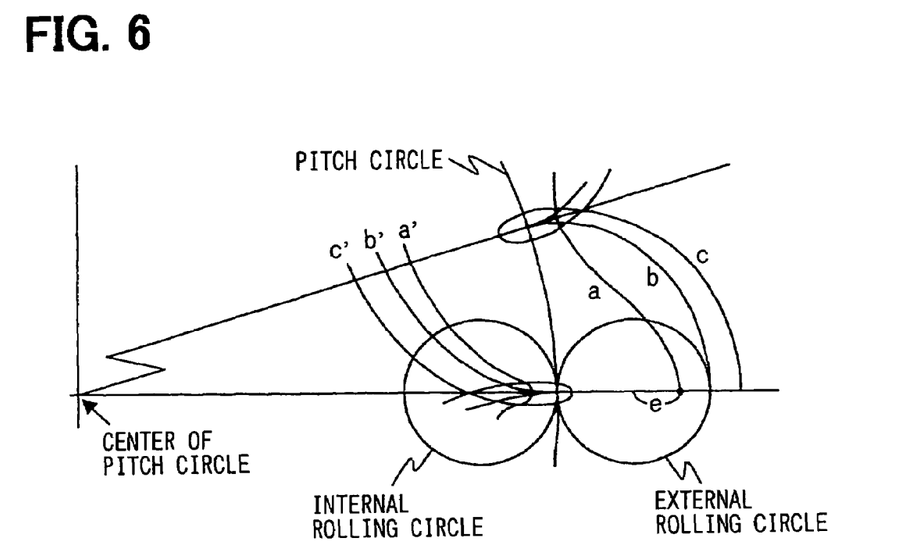
FIG. 6 is an explanatory view of various cycloid curves.

The definition of cycloid curves will be described with reference to FIG. 6. A cycloid curve is a locus traced out by a point on a rolling circle in a radial direction when an external rolling circle or an internal rolling circle is rolled on a circular arc of a pitch circle (base circle) without causing any slides, as indicated by curves a, b, c, a', b', and c' in FIG. 6.

Among the cycloid curves, a locus traced out by rolling the external rolling circle is generally referred to as an epicycloid curve (a, b, and c), whereas a locus traced out by rolling the internal rolling circle is generally referred to as a hypocycloid curve (a', b', and c'). More specifically, cycloid curves traced out by a point inside a rolling circle (inside in a radial direction) are referred to as a prolate epicycloid curve (a) and a prolate hypocycloid curve (a'), whereas those traced by a point outside a rolling circle (outside in a radial direction) are referred to as a curtate epicycloid curve (c) and a curtate hypocycloid curve (c').

Cycloid curves traced out by a point on a circular arc of a rolling circle are simply referred to as an epicycloid curve (b) and a hypocycloid curve (b'). The epicycloid curves and the hypocycloid curves used in the present invention designate the epicycloid curve (b) and the hypocycloid curve (b') traced out by a point on the circular arc of the rolling circle.

Next, tooth profiles of the external gear 3 and the internal gear 4 will be described. The tooth profiles of the external gear 3 and the internal gear 4 are such that the tooth profile inside the pitch circle is provided by a hypocycloid curve and the tooth profile outside the pitch circle is provided by an epicycloid curve.

Specific tooth profiles of the external gear 3 and the internal gear 4 are provided to satisfy the following conditions:

$\phi D1/N = \phi D2/M$;

$\phi D1H > \phi D1E$;

$\phi D1H + \phi D1E = \phi D1/N$;

$\phi D2H < \phi D2E$;

$\phi D2H + \phi D2E = \phi D2/M$;

$\phi D1H = \phi D2E$; and $\phi D1E = \phi D2H$, where N is the number of teeth of the external gear 3, $\phi D1$ is a diameter of the pitch circle of the external gear 3, M is the number of teeth of the internal gear 4, $\phi D2$ is a diameter of the pitch circle of the internal gear 4, $\phi D1H$ is a diameter of a rolling circle for tracing a hypocycloid curve for forming a tooth profile curve of the external gear 3, $\phi D1E$ is a diameter of a rolling circle for tracing an epicycloid curve for forming a tooth profile curve of the external gear 3, $\phi D2H$ is a diameter of a rolling circle for tracing a hypocycloid curve for forming a tooth profile curve of the internal gear 4, and $\phi D2E$ is a diameter of a rolling circle for tracing an epicycloid curve for forming a tooth profile curve of the internal gear 4. More specifically, by satisfying the relationships: $\phi D1/N = \phi D2/M$; $\phi D1H > \phi D1E$; and $\phi D1H + \phi D1E = \phi D1/N$, the tooth profile of the external gear 3 is obtained as indicated by a solid line A in FIG. 7, forming a predetermined clearance Ax with respect to a tooth profile indicated by a solid line B in FIG. 7 having a clearance 0.

By satisfying the relationships: $\phi D1/N = \phi D2/M$; $\phi D2H < \phi D2E$; and $\phi D2H + \phi D2E = \phi D2/M$, the tooth profile of the internal gear 4 is obtained as indicated by a solid line C in FIG. 7, forming a predetermined clearance Δy with respect to the tooth profile indicated by the solid line B in FIG. 7 having a clearance 0. Furthermore, by satisfying the relationships: $\phi D1H = \phi D2E$; and $\phi D1E = \phi D2H$, the clearances Δx and Δy, which are respectively formed for the external gear 3 and the internal gear 4, become equal to each other (Δx=Δy). By providing the tooth profiles in this manner, the clearances are formed for both the external gear 3 and the internal gear 4 so as to surely avoid the interference between the external gear 3 and the internal gear 4.

Figure 7:
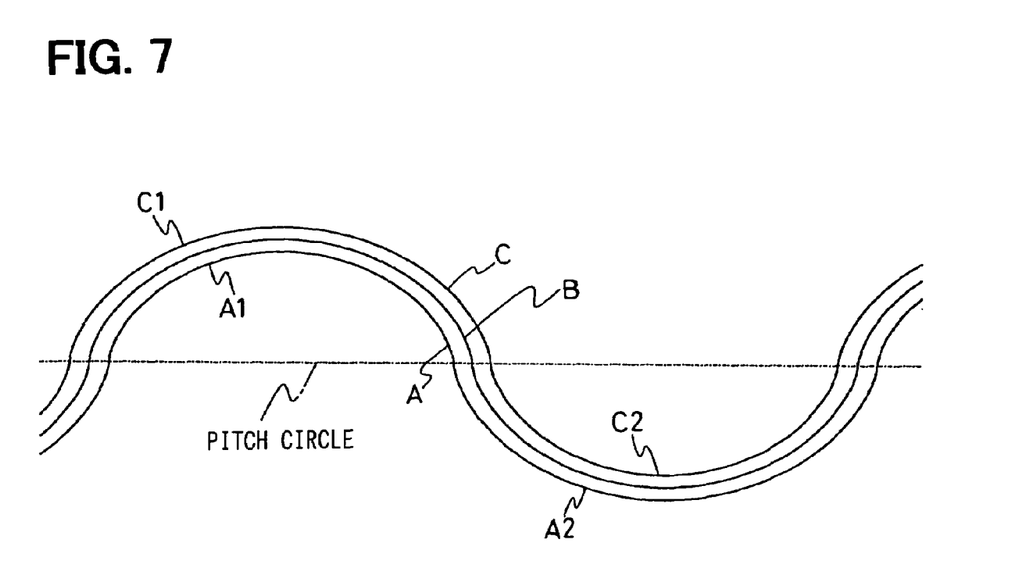
FIG. 7 is a view showing tooth profiles of an external gear and an internal gear.
Figure 8:
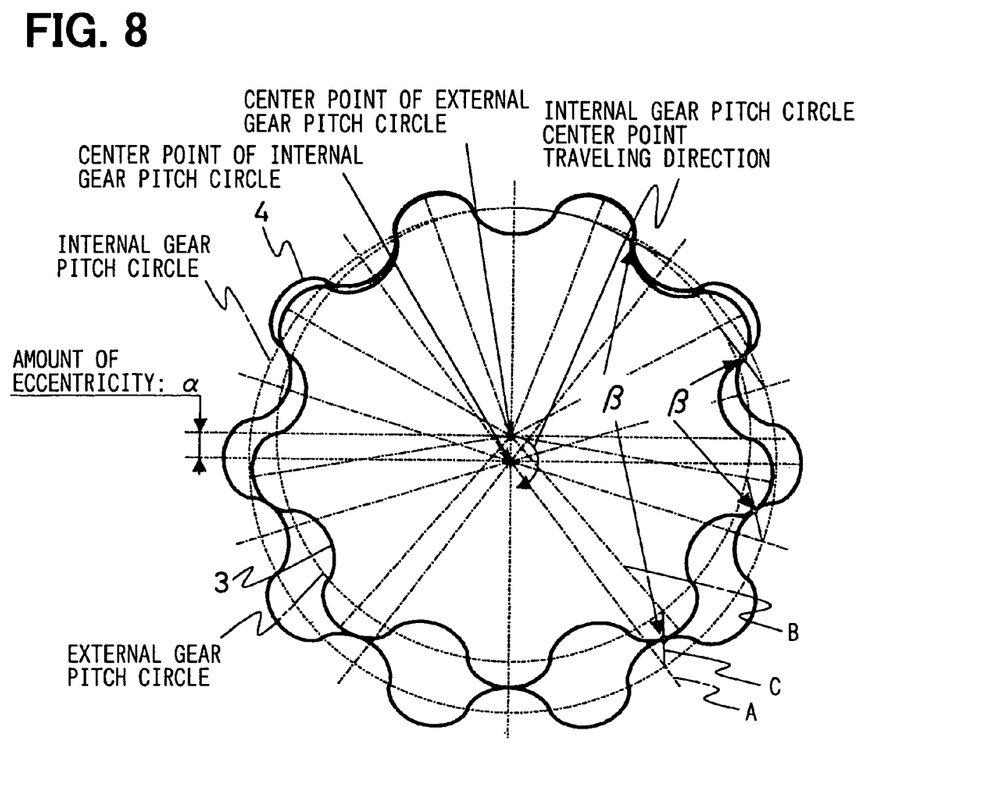
FIG. 8 is an explanatory view showing contact points between the external gear and the internal gear.

In this case, the solid line A in FIG. 7 indicating the tooth profile of the external gear 3 is obtained by connecting the epicycloid curve (see a curve A1 in FIG. 7) outside the pitch circle and the hypocycloid curve (see a curve A2 in FIG. 7) inside the pitch circle, whereas the solid line C in FIG. 7 indicating the tooth profile of the internal gear 4 is obtained by connecting the epicycloid curve (see a curve C1 in FIG. 7) outside the pitch circle and the hypocycloid curve (see a curve C2 in FIG. 7) inside the pitch circle, FIG. 8 is a view for explaining contact points β between the external gear 3 and the internal gear 4 (which contact points contribute to torque transmission, and are referred to as contact points β). In the illustrated example, the number N of teeth of the external gear 3=9, and the number M of teeth of the internal gear 4=10.

As shown in FIG. 8, the contact points β are not present on an inner diameter side from the pitch circle of the external gear 3 except for the contact point β at the top in FIG. 8 (a portion in which the external gear 3 and the internal gear 4 become the closest in a radial direction). As moving away from the contact point β at the top, the contact point β becomes closer in an outer diameter direction of the external gear 3, with the effects of torque transmission being reduced. In the lower part of FIG. 8, the external gear 3 and the internal gear 4 get out of contact. As a result, the torque transmission is not effective any more.

The internal gear 4 never has the contact point β in an outer diameter direction from the pitch circle of the internal gear 4. An alternate long and short dash line A in FIG. 8 is a line segment connecting the center of teeth of the internal gear 4 given by the hypocycloid curve and the center of the pitch circle of the internal gear 4. An alternate long and short dash line B in FIG. 8 is a line segment connecting the center of teeth of the external gear 3 given by the epicycloid curve and the center of the pitch circle of the external gear 3.

Furthermore, a solid line C in FIG. 8 is a line segment connecting an intersection point between the alternate long and short dash line A and the pitch circle of the internal gear 4 and an intersection point between the alternate long and short dash line β and the pitch circle of the external gear 3. The contact points β contributing to torque transmission are intersection points between the solid line C and the teeth. If the center point of the pitch circle of the external gear 3 eccentrically rotates clockwise in FIG. 8, the contact points β are uniquely present on the right side of a line segment passing through the center of the pitch circle of the external gear 3 and the center of the pitch circle of the internal gear 4.

Figure 9:
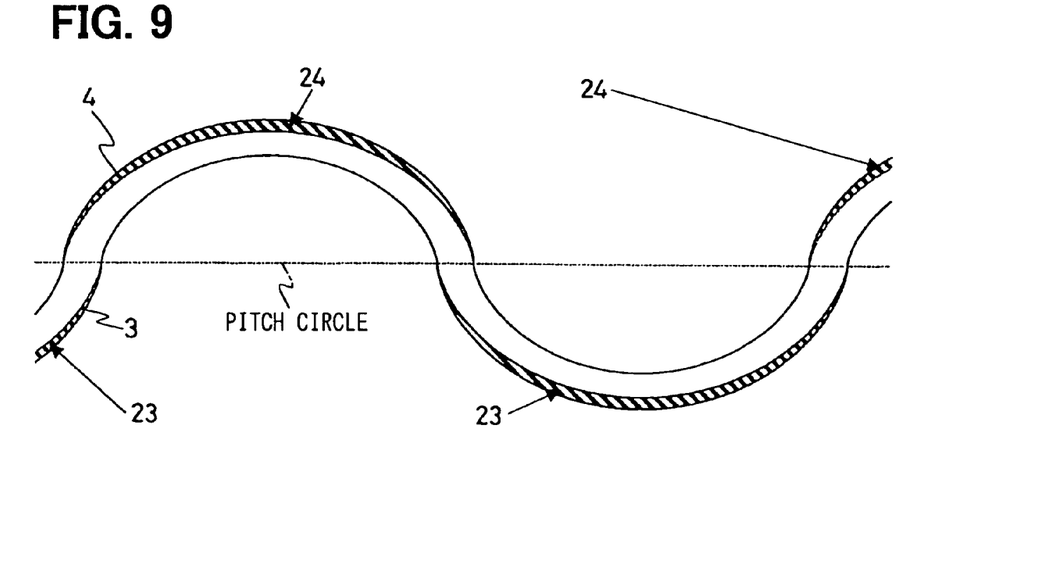
FIG. 9 is an explanatory view of recesses provided for the external gear and the internal gear.

As shown in FIG. 9, for the part of the tooth profile of the external gear 3, which is given by the hypocycloid curve, a recess 23 (indicated by a hatched area in FIG. 9) is formed. The recess 23 has an increasing width in an inner diameter direction from the pitch circle serving to trace the hypocycloid curve.

For the part of the tooth profile of the internal gear 4, which is drawn by the epicycloid curve, a recess 24 (indicated by a hatched area in FIG. 9) is formed. The recess 24 has an increasing width in an outer diameter direction from the pitch circle serving to trace the epicycloid curve.

By providing the recesses 23 and 24 for both the external gear 3 and the internal gear 4, it is ensured to prevent an abrasion loss due to contact of a tooth top, which does not contribute to torque transmission. Moreover, since the recesses 23 and 24 can be used as grease cups, a grease can be prevented from running short at the mesh point between the external gear 3 and the internal gear 4. Since the epicycloid curve and the hypocycloid curve can be smoothly connected, stress concentration due to contact of a projecting portion can be alleviated to prevent the partial abrasion of the tooth surfaces.

Next, the relationship between the inner pin holes 21 and the inner pins 22 will be described. A diameter φDPCD-hole of a pitch circle of the inner pin holes 21 is set equal to a diameter φDPCD-pin of a pitch circle of the inner pins 22 (φDPCD-hole=φDPCD-pin).

Moreover, the plurality of inner pin holes 22 are provided at equiangular intervals for the pitch circle of the inner pin holes 21. Similarly, the plurality of inner pins 22 are provided at equiangular intervals for the pitch circle of the inner pins 22. Moreover, a diameter φDhole of the inner pin hole 21 is set larger than the sum of the amount of eccentricity α and a diameter φDpin of the inner pin 22 (φDhole>α+φDpin).

By setting the values as described above, the dimensional relationship of the inner pin diameter φDpin and the inner pin hole diameter φDhole with respect to the amount of eccentricity α can be optimized, thereby preventing a torque ripple due to a twist generated between the inner pin 22 and the inner pin hole 21. Next, the amount of eccentricity α of the eccentric part 1 will be described.

Figure 2:
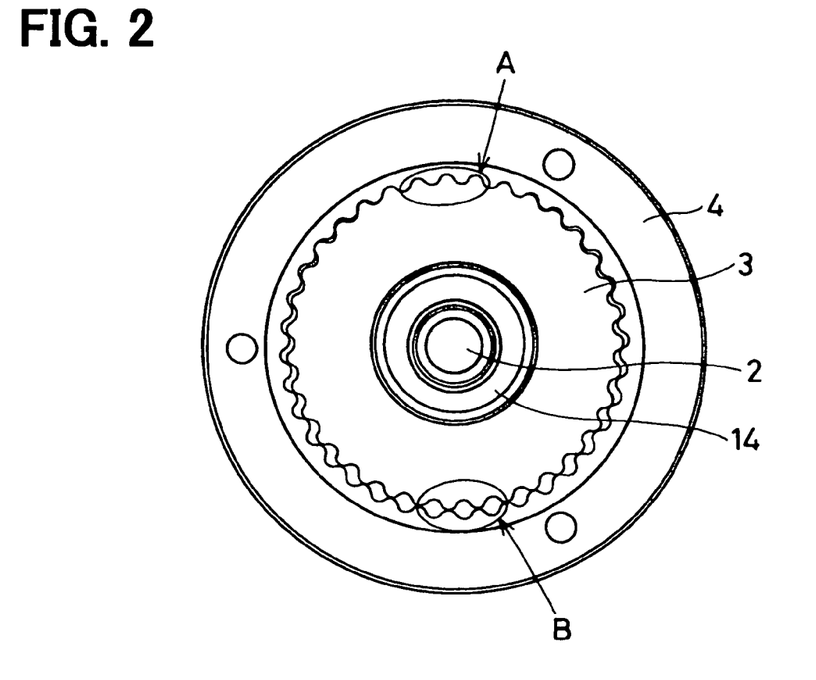
FIG. 2 is a view of the internal planetary gear mechanism viewed from direction B (front side) in FIG. 1.
Figure 3:
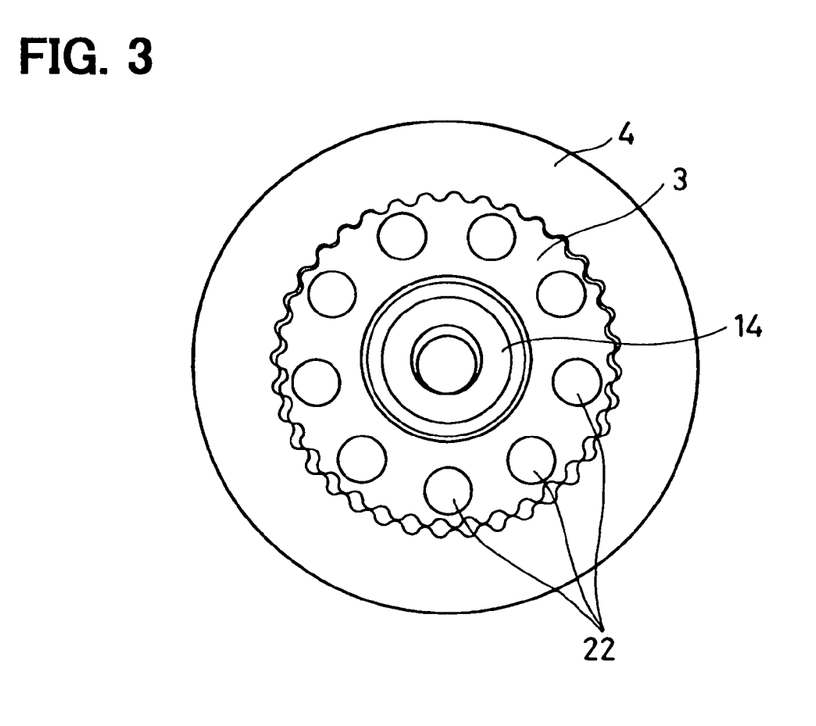
FIG. 3 is a view of the internal planetary gear mechanism viewed from direction A (rear side) in FIG. 1.
Figure 4:
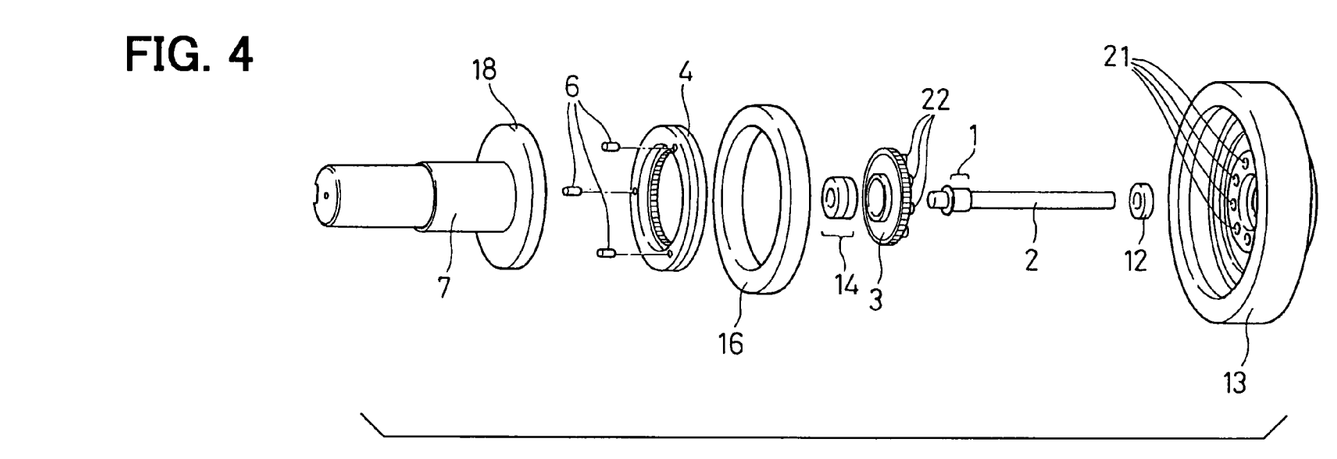
FIG. 4 is an exploded perspective view of the internal planetary gear mechanism viewed from the front side.
Figure 5:
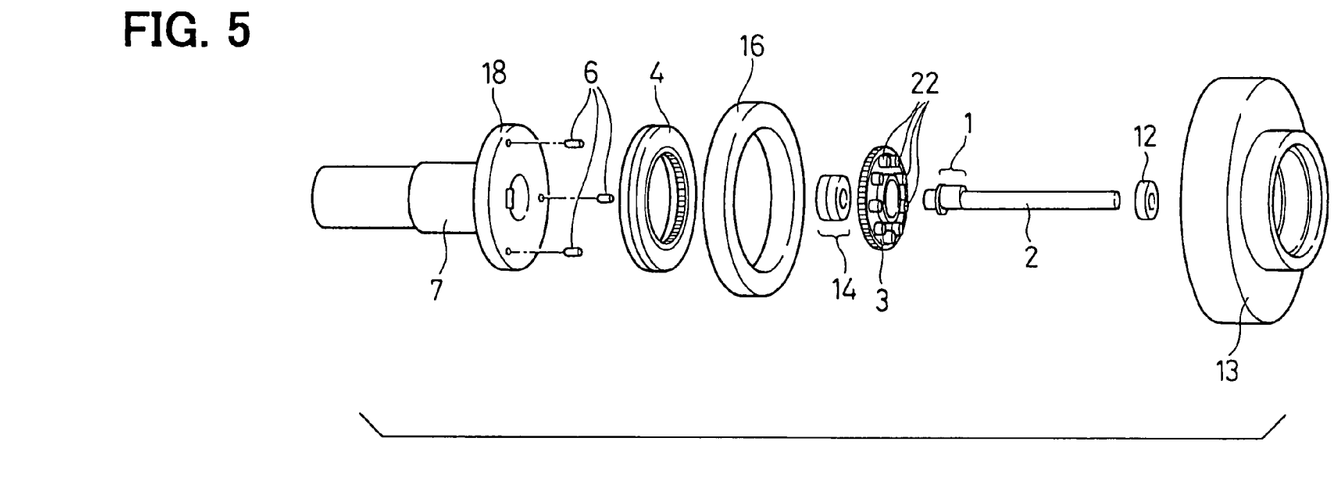
FIG. 5 is an exploded perspective view of the internal planetary gear mechanism viewed from the rear side.
Figure 10:
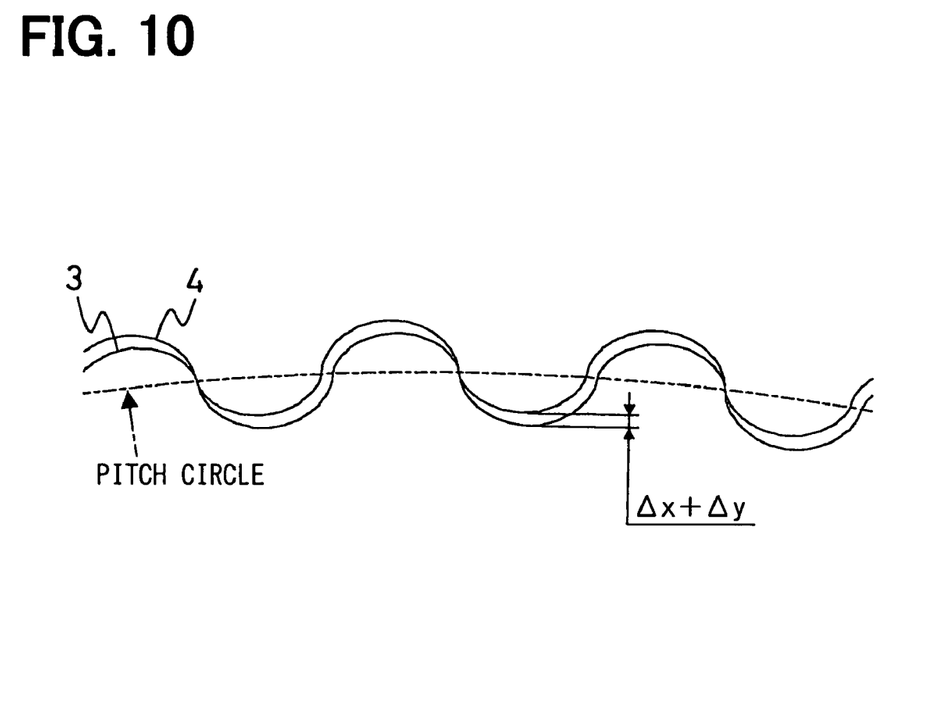
FIG. 10 is an enlarged view of portion A in FIG. 2.
Figure 11:
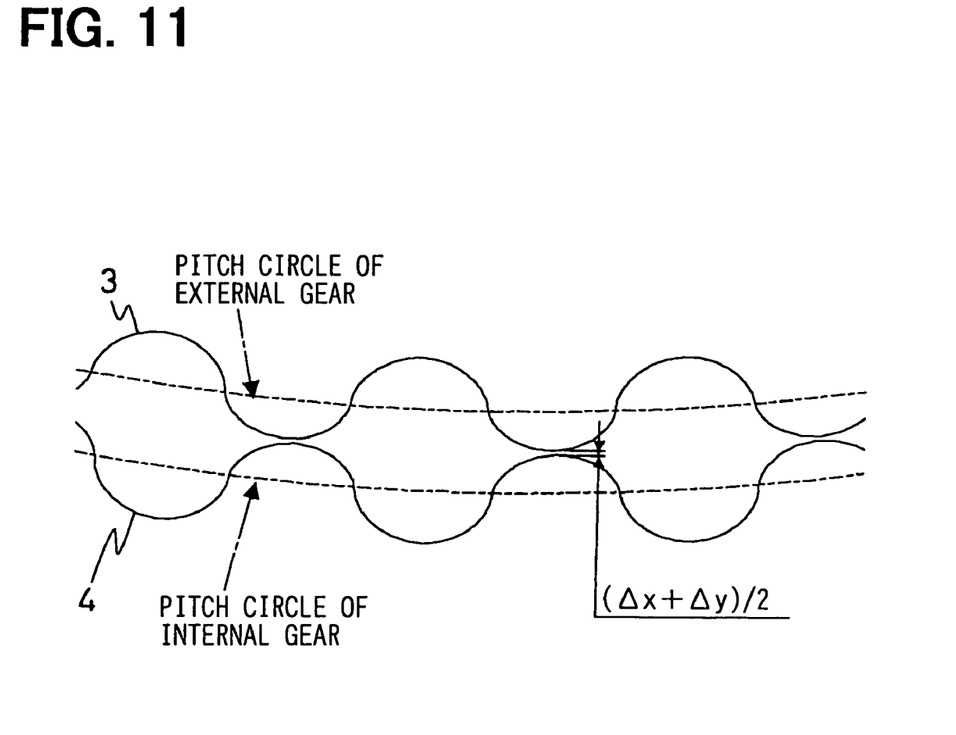
FIG. 11 is an enlarged view of portion B in FIG. 2.

First, the case where the amount of eccentricity α is set to a theoretical value will be described. Herein, an enlarged view of a portion indicated by an arrow A in FIG. 2 is shown in FIG. 10, whereas an enlarged view of a portion indicated by an arrow B in FIG. 2 is shown in FIG. 11.

If the amount of eccentricity α of the rotation center of the eccentric part 1 with respect to the rotation center of the first shaft 2 is set as expressed by:

$$\alpha = \{(\phi D1/N)/2\} \times (M-N),$$

that is, set to a theoretical value, a clearance (Δx+Δy) between the external gear 3 and the internal gear 4 in a radial direction in a portion in which the external gear 3 and the internal gear 4 become the closest to each other in a radial direction (see FIG. 10) is expressed by:

$$(\Delta x + \Delta y) = (\phi D1H - \phi D1E) + (\phi D2E - \phi D2H)$$

The closest distance (Δx+Δy)/2 between the external gear 3 and the internal gear 4 in a portion in which the external gear 3 and the internal gear 4 are the furthest away from each other in a radial direction (see FIG. 11) is expressed by:

$$(\Delta x + \Delta y)/2 = \{(\phi D1H - \phi D1E) + (\phi D2E - \phi D2H)\}/2$$

Accordingly, it is found that the amount of eccentricity α can be set within the range of:

from $\{(\phi D1/N)/2\} \times (M-N)$ to $\{(\phi D1/N)/2\} \times (M-N) + 2(\phi D2E - \phi D2H).$ The operations of the gears (the external gear 3 and the internal gear 4) will now be described with reference to FIG. 12.

Figure 12:
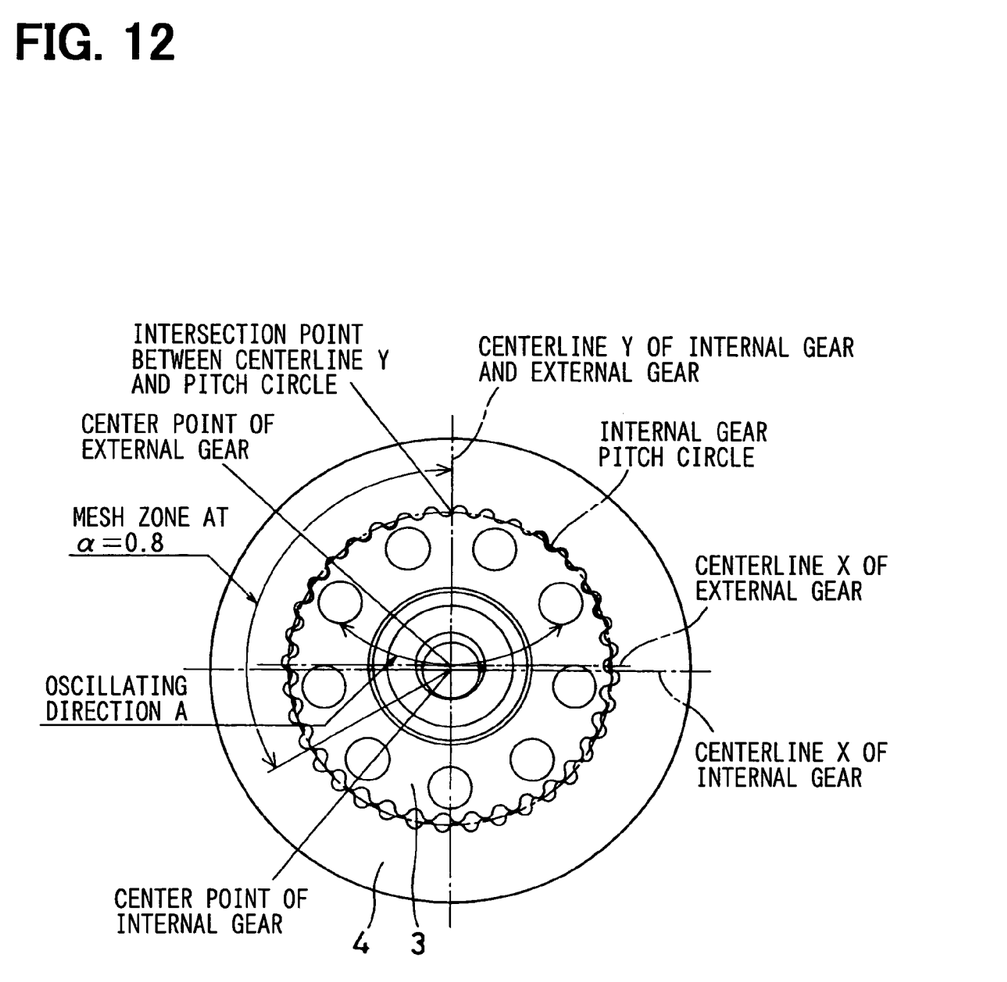
FIG. 12 is a view showing a meshing state in the case where the amount of eccentricity is set to a theoretical value (α=0.8)

FIG. 12 shows the case where a module=φD1/N=1.6, the number N of teeth of the external gear 3=35, the number M of teeth of the internal gear 4=36, (φD1H−φD1E)=(φD2E−φD2H)=0.04, and the amount of eccentricity α=0.8 (theoretical value).

(a) The external gear 3 is rotated in a oscillating direction A about an intersection point between a center line Y and the pitch circle of the internal gear 4, so that mesh points successively shift to transmit the turning force. This function is achieved by the rotation of the first shaft 2 provided coaxially with the internal gear 4. The external gear 3 is pushed so as to oscillate in the oscillating direction A about the intersection point between the center line Y and the pitch circle of the internal gear 4 by the eccentric part 1 provided for the first axis 2.

In simple terms, it can be considered that the external gear 3 is oscillated in a horizontal direction (the oscillating direction A) about the intersection point between the center line Y and the pitch circle of the internal gear 4 with an arm having a length equal to a distance from the center point of the internal gear 4 to the center point of the external gear 3 (i.e., the amount of eccentricity α) about the center point of the internal gear 4 as an axis of rotation.

Therefore, considering a force F applied in the oscillating direction A in the case where the first shaft 2 rotates by a certain torque T, the torque T is expressed by:

(turning radius)×(force F). Therefore, it is found that a turning radius is increased by increasing the amount of eccentricity α to reduce the force F applied in the oscillating direction A.

This means that a load on the bearing (the third roller bearing 14), a load (surface pressure) generated on meshing tooth surfaces of the external gear 3 and the internal gear 4, a load generated on a sliding portion between the inner pin hole 21 and the inner pin 22 and the like are reduced. As a result, it is found that a loss expressed by: (friction coefficient)×(load)×(velocity) can be reduced.

Figure 13:
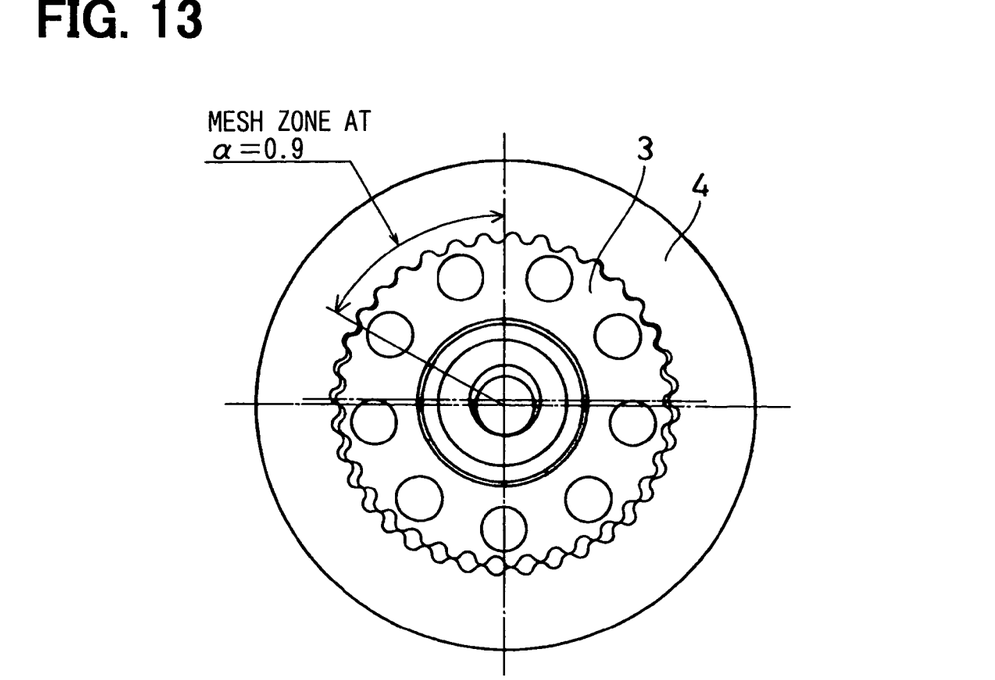
FIG. 13 is a view showing a meshing state under the same conditions as those of FIG. 12, without changing a module and the like, except that the amount of eccentricity is set to 0.9.
Figure 14:
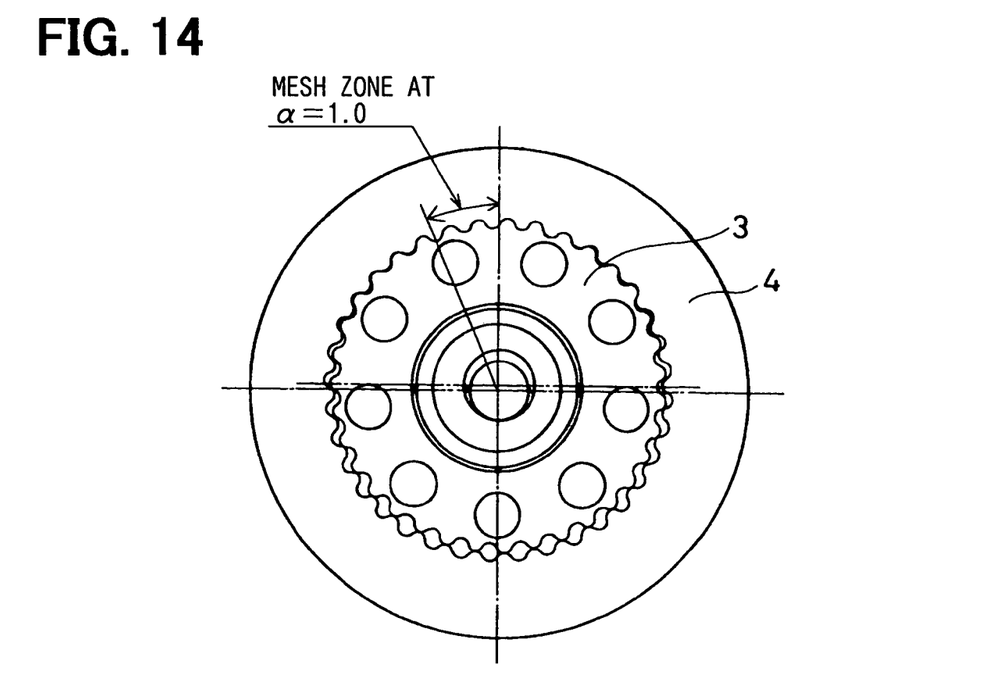
FIG. 14 is a view showing a meshing state under the same conditions as those of FIG. 12, without changing a module and the like, except that the amount of eccentricity is set to 1.0.

(b) FIG. 12 shows the case of the amount of eccentricity α=0.8 (theoretical value). On the other hand, the case where the amount of eccentricity α is increased to be larger than the theoretical value, that is, α=0.9, is shown in FIG. 13. The case where the amount of eccentricity α is more increased to be larger than the theoretical value, that is, α=1.0, is shown in FIG. 14. The relationship between an angle at a mesh position and a pressure angle between the gears is shown in FIGS. 15A and (b).

As shown in FIGS. 12 to 14, it is found that, as the amount of eccentricity α gradually increases from 0.8, 0.9 to 1.0, the mesh zone is reduced.

Figure 15A:
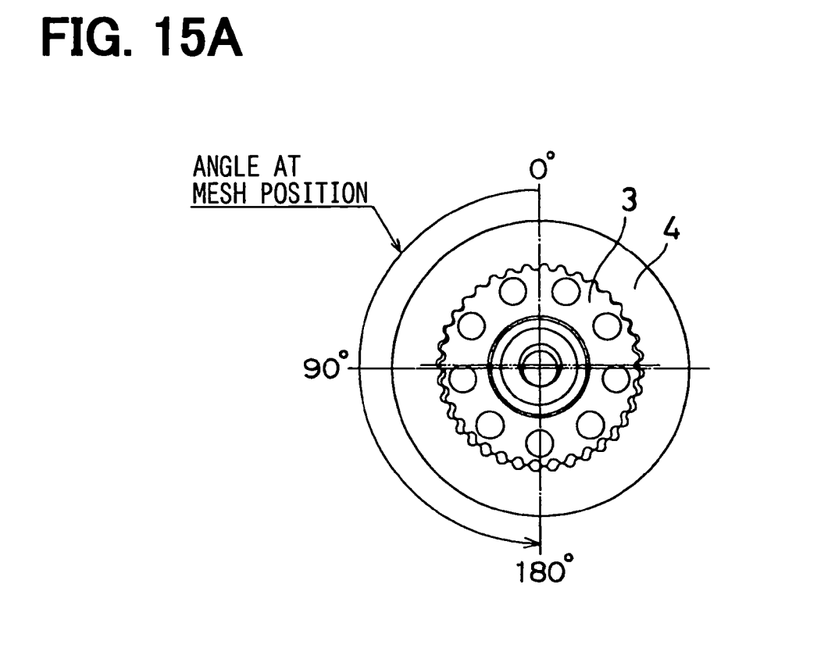
FIG. 15A is a view showing mesh positions.
Figure 15B:
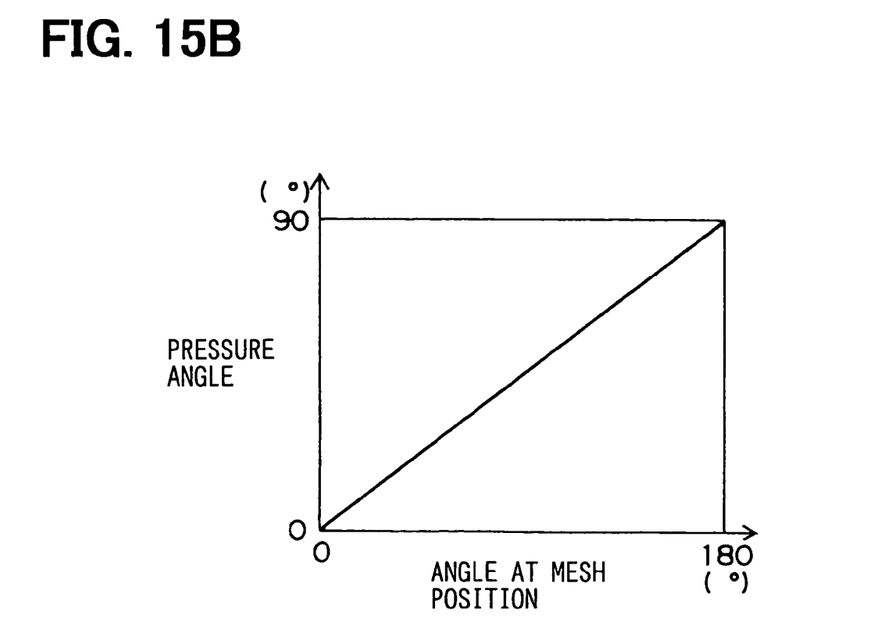
FIG. 15B is a graph showing the relationship between an angle at the mesh position and a pressure angle between the gears.
Figure 16:
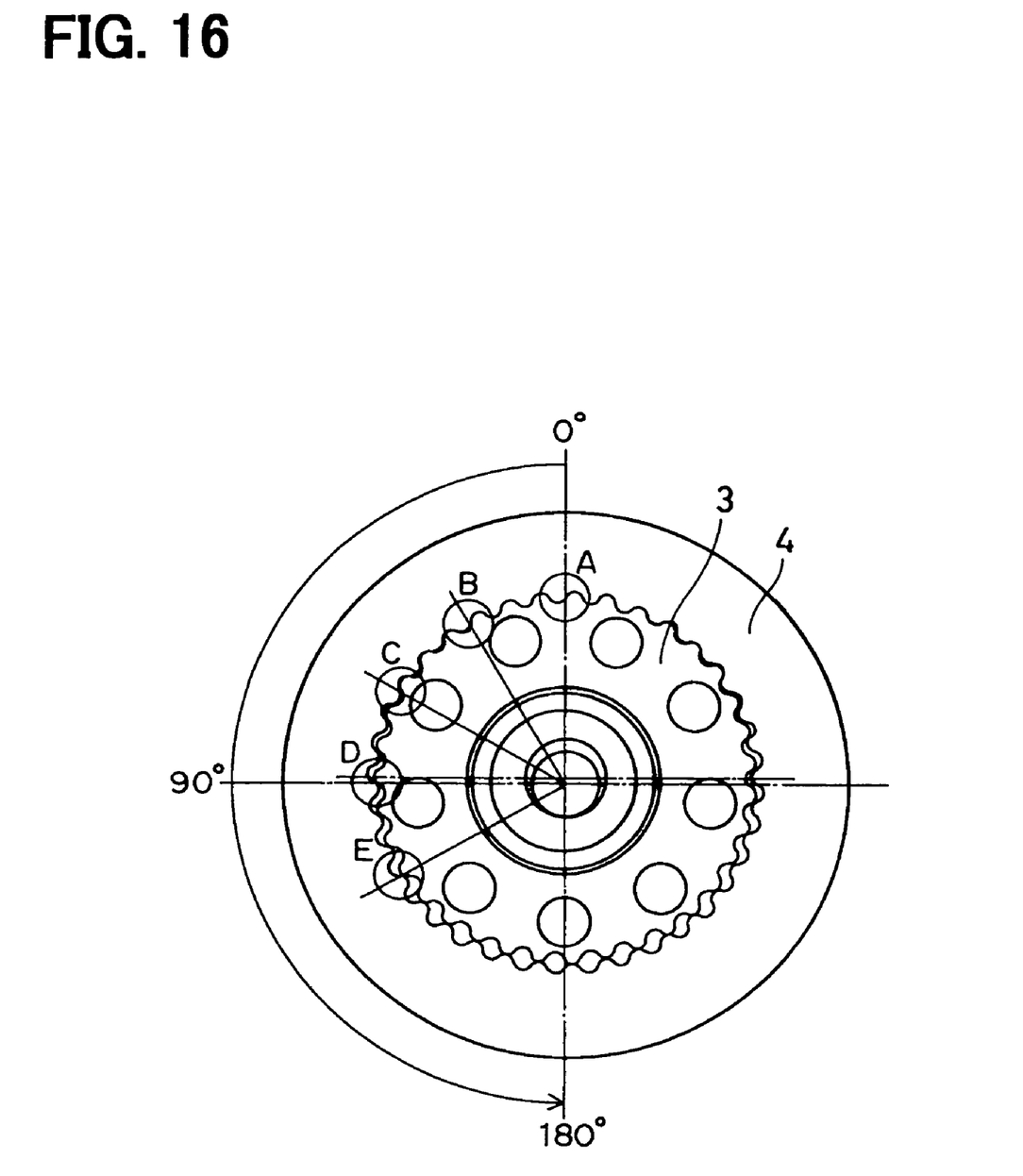
FIG. 16 is a view showing mesh positions.
Figure 17A:
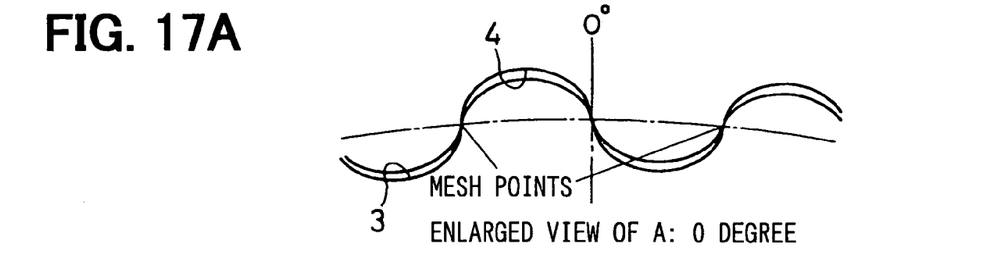
FIGS. 17A to 17E are enlarged views of mesh areas, which show differences of meshing points depending on the mesh position shown in FIG. 16.
Figure 17B:
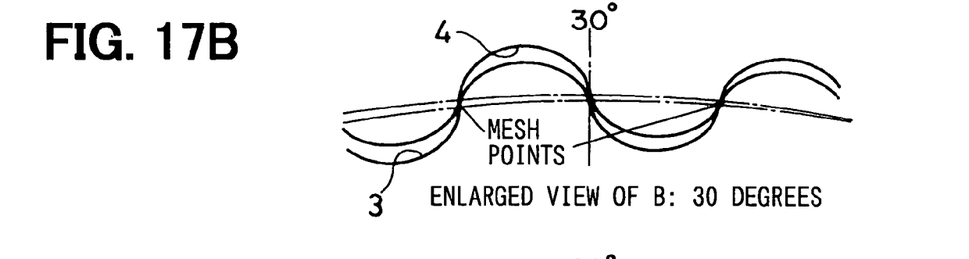
Figure 17C:
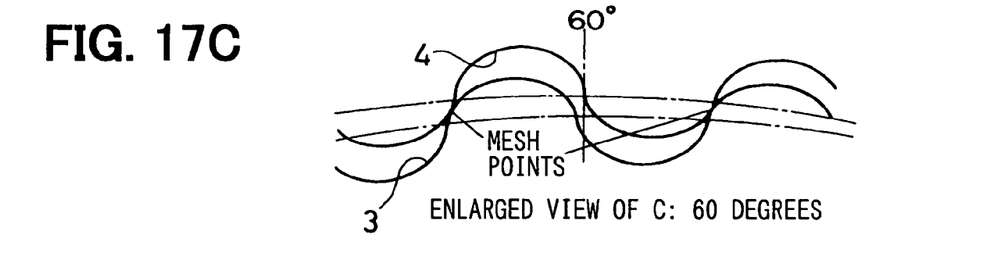
Figure 17D:
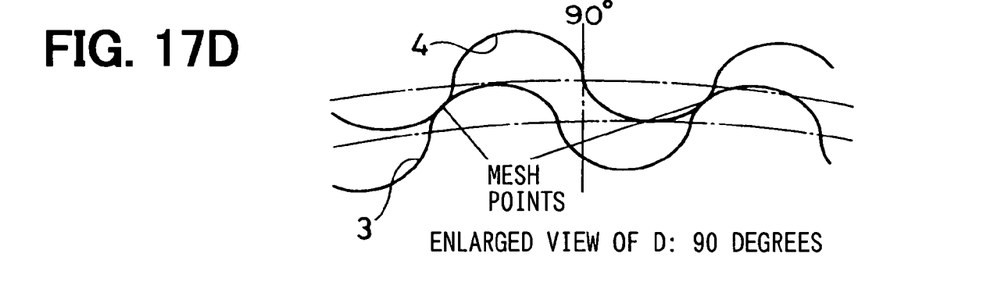
Figure 17E:
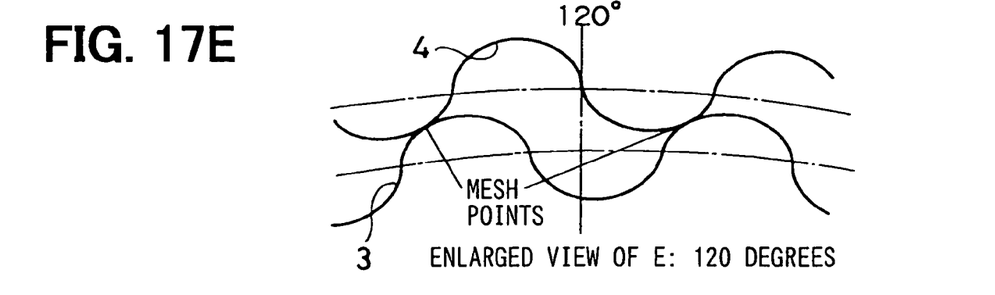

In this case, as shown in FIGS. 15A and 15B, when an angle at the mesh position is 0 degree, a pressure angle is also 0 degree. As the angle at the mesh position increases, the pressure angle also gradually increases in such a way that the pressure angle of 90 degrees is achieved when the angle at the mesh position is 180 degrees.

The turning force with respect to the force applied to the external gear 3 and the internal gear 4 is obtained by the expression:

(force applied to the gears)×cos(pressure angle).

Therefore, a large pressure angle means that the applied force is lost without serving as a turning force. Thus, a transmission loss of the turning force can be reduced by intentionally increasing the amount of eccentricity α to be larger than the theoretical value 0.8 to reduce the mesh zone.

(c) The external gear 3 and the internal gear 4 are in contact with each other so that their mesh points shift while they are sliding within the mesh zone during the operation as shown in FIGS. 16 to 17(A) to 17(E).

Then, as the amount of eccentricity α increases, the mesh zone is reduced as described above. It can be considered that a contact form transits from slide contact to rolling contacts as the amount of eccentricity α increases. Therefore, as the amount of eccentricity α increases, a loss due to a slide generated between the tooth surfaces of the external gear 3 and the internal gear 4 can be reduced to decrease a transmission loss of the turning force.

Moreover, since the slide contact is reduced, the abrasion on the tooth surfaces due to slide contact can be prevented to improve an endurance life of the external gear 3 and the internal gear 4. As a result, although the external gear 3 and the internal gear 4 are conventionally quenched because a large abrasion is caused on the tooth surfaces on which slide contact occurs, the quenching is no more needed. Accordingly, a strain due to quenching can be prevented from being generated.

Summarizing the above-described points (a) to (c), the following effects can be obtained by setting the amount of eccentricity α to be larger than the theoretical value.

(a) A load generated on the tooth surfaces of the external gear 3 and the internal gear 4 and a radial load applied to the bearing (the third roller bearing 14) can be reduced.

(b) Since the external gear 3 and the internal gear 4 mesh with each other at the position at a small pressure angle, the turning force can be efficiently transmitted.

(c) A contact form between the external gear 3 and the internal gear 4 transits from slide contact to rolling contact so as to realize the efficient transmission of a turning force. At the same time, an endurance life of the external gear 3 and the internal gear 4 can be improved.

[Variations]

In the above-described first embodiment, the following reduction gear is described by way of example. The first shaft 2 serves as an input shaft. The rotation of the external gear 3 is regulated by the anti-rotation means 5. The internal gear 4 rotated by oscillating the external gear 3 is connected to the second shaft 7 so as to take a rotational output of the internal gear 4 from the second shaft 7.

Alternatively, a reduction gear, to which the present invention is applied, may be configured in the following manner. The first shaft 2 serves as an input shaft. The internal gear 4 is secured. With the anti-rotation means 5 provided between the external gear 3 and the second shaft 7, the rotation of the external gear 3 is regulated by the second shaft 7. Only a revolutionary operation of the external gear 3 with respect to the first shaft 2 is taken from the second shaft 7.

In the above-described Embodiment 1, the following reduction gear is described by way of example. The first shaft 2 serves as an input shaft. The rotation of the external gear 3 is regulated by the anti-rotation means 5. The internal gear 4 rotated by oscillating the external gear 3 is connected to the second shaft 7 so as to take a rotational output of the internal gear 4 from the second shaft 7. However, an overdrive gear may be configured by replacing the input shaft and the output shaft with each other; the present invention may be applied to the thus configured overdrive gear.

As an example of a variation, the reduction gear, in which the first shaft 2 serves as an input shaft, the internal gear 4 is secured, the anti-rotation means 5 provided between the external gear 3 and the second shaft 7 regulates the rotation of the external gear 3 by the second shaft 7, and only a revolutionary operation of the external gear 3 with respect to the first shaft 2 is taken from the second shaft 7, has been described. Also in this case, an overdrive gear may be configured by replacing the input shaft and the output shaft with each other; the present invention may be applied to the thus configured overdrive gear.

Therefore, an internal planetary gear mechanism has an internal gear; an eccentric part eccentrically rotatable with respect to a center of a pitch circle of the internal gear; and an external gear rotatably provided around the eccentric part through a bearing so as to mesh with the internal gear. A tooth profile of each of the external gear and the internal gear is provided by a cycloid curve, and the amount of eccentricity α of the eccentric part is set to be larger than a theoretical value expressed by $(\phi D1/N) \times 0.5 \times (M-N)$, where M is the number of teeth of the internal gear, N is the number of teeth of the external gear, and $\phi D1$ is a diameter of a pitch circle of the external gear.

The tooth profiles of the external gear and the internal gear may be configured such that the tooth profile inside a pitch circle is provided by a hypocycloid curve and the tooth profile outside the pitch circle is provided by an epicycloid curve.

A part of the tooth profile of the external gear, which is given by the hypocycloid curve, is provided with a recess having an increasing width in an inner diameter direction from the pitch circle for tracing the hypocycloid curve. Additionally, it is possible that a part of the tooth profile of the internal gear, which is given by the epicycloid curve, is provided with a recess having an increasing width in an outer diameter direction from the pitch circle for tracing the epicycloid curve.

The relationship: $\phi D1/N = \phi D2/M$ is satisfied where N is the number of teeth of the external gear, $\phi D1$ is a diameter of the pitch circle of the external gear, M is the number of teeth of the internal gear, $\phi D2$ is a diameter of the pitch circle of the internal gear, $\phi D1H$ is a diameter of a rolling circle for tracing a hypocycloid curve for forming a tooth profile curve of the external gear, $\phi D1E$ is a diameter of a rolling circle for tracing an epicycloid curve for forming a tooth profile curve of the external gear, $\phi D2H$ is a diameter of a rolling circle for tracing a hypocycloid curve for forming a tooth profile curve of the internal gear, and φD2E is a diameter of a rolling circle for tracing an epicycloid curve for forming a tooth profile curve of the internal gear.

The relationships: φD1H>φD1E; and φD1H+φD1E=φD1/N are satisfied. The relationships: φD2H<φD2E; and φD2H+φD2E=φD2/M are satisfied. The relationships: φD1H>φD1E; φD1H+φD1E =φD1/N; φD2H<φD2E; φD2H+φD2E=φD2/M; φD1H=φD2E; and φD1E=φD2H are also satisfied.

The internal planetary gear mechanism has an anti-rotation means for regulating the rotation of the external gear, the anti-rotation means may constitute a plurality of inner pin holes provided on the same circumference on a member whose rotation is regulated, and a plurality of inner pins provided on the same circumference on the external gear, each being inserted into each of the inner pin holes with a play so that its one end is secured to the external gear.

The internal planetary gear mechanism has anti-rotation means for regulating the rotation of the external gear, the anti-rotation means may alternatively constitute a plurality of inner pin holes provided on the same circumference on the external gear, and a plurality of inner pins provided on the same circumference on a member whose rotation is regulated, each being inserted into each of the inner pin holes with a play so that its one end is secured to the member whose rotation is regulated.

The internal planetary gear mechanism has a diameter φDPCD-hole of a pitch circle for forming the plurality of inner pin holes set equal to a diameter φDPCD-pin of a pitch circle for forming the plurality of inner pins. The internal planetary gear mechanism has a plurality of inner pin holes provided at equiangular intervals for the pitch circle for forming the inner pin holes, and the plurality of inner pins are provided at equiangular intervals for the pitch circle for forming the plurality of inner pins. The internal planetary gear mechanism has a diameter φDhole of the inner pin hole set equal to or larger than the sum of the amount of eccentricity α of the eccentric part and a diameter φDpin of the inner pin.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An internal planetary gear mechanism comprising:
   an internal gear;
   an eccentric part eccentrically rotatable with respect to a center of a pitch circle of the internal gear; and
   an external gear rotatably provided around the eccentric part through a bearing so as to mesh with the internal gear,
   wherein a tooth profile of each of the external gear and the internal gear is provided by a cycloid curve; and
   the amount of eccentricity α of the eccentric part is set to be larger than a theoretical value expressed by:

(φD1/N)×0.5×(M−N)

where M is the number of teeth of the internal gear, N is the number of teeth of the external gear, and φD1 is a diameter of a pitch circle of the external gear.

2. The internal planetary gear mechanism according to claim 1, wherein
   tooth profiles of the external gear and the internal gear are configured such that the tooth profile inside a pitch circle is provided by a hypocycloid curve and the tooth profile outside the pitch circle is provided by an epicycloid curve.

3. The internal planetary gear mechanism according to claim 2, wherein
   a part of the tooth profile of the external gear, which is given by the hypocycloid curve, is provided with a recess having an increasing width in an inner diameter direction from the pitch circle for tracing the hypocycloid curve.

4. The internal planetary gear mechanism according to claim 2, wherein
   a part of the tooth profile of the internal gear, which is given by the epicycloid curve, is provided with a recess having an increasing width in an outer diameter direction from the pitch circle for tracing the epicycloid curve.

5. The internal planetary gear mechanism according to claim 2, wherein
   the relationship: φD1/N=φD2/M is satisfied where N is a number of teeth of the external gear,
   φD1 is a diameter of the pitch circle of the external gear,
   M is a number of teeth of the internal gear,
   φD2 is a diameter of the pitch circle of the internal gear,
   φD1H is a diameter of a rolling circle for tracing a hypocycloid curve for forming a tooth profile curve of the external gear,
   φD1E is a diameter of a rolling circle for tracing an epicycloid curve for forming a tooth profile curve of the external gear,
   φD2H is a diameter of a rolling circle for tracing a hypocycloid curve for forming a tooth profile curve of the internal gear, and
   φD2E is a diameter of a rolling circle for tracing an epicycloid curve for forming a tooth profile curve of the internal gear.

6. The internal planetary gear mechanism according to claim 5, wherein
   the relationships: φD1H>φD1E; and φD1H+φD1E=φD1/N are satisfied.

7. The internal planetary gear mechanism according to claim 5, wherein
   the relationships: φD2H<φD2E; and φD2H+φD2E=φD2/M are satisfied.

8. The internal planetary gear mechanism according to claim 5, wherein
   the relationships:

φD1H>φD1E;

φD1H+φD1E=φD1/N;

φD2H<φD2E;

φD2H+φD2E=φD2/M;

φD1H=φD2E; and

φD1E=φD2H are satisfied.

9. The internal planetary gear mechanism according to claim 1, further comprising:
   a plurality of inner pin holes defined on a same circumference on a member whose rotation is regulated; and
   a plurality of inner pins provided on a same circumference on the external gear, each being inserted into each of the inner pin holes with play so that its one end is secured to the external gear.

10. The internal planetary gear mechanism according to claim 1, further comprising:
   a plurality of inner pin holes provided on the same circumference on the external gear; and
   a plurality of inner pins provided on the same circumference on a member whose rotation is regulated, each being inserted into each of the inner pin holes with a play so that its one end is secured to the member whose rotation is regulated.

11. The internal planetary gear mechanism according to claim 9, wherein
   a diameter φDPCD-hole of a pitch circle for forming the plurality of inner pin holes is set equal to a diameter φDPCD-pin of a pitch circle for forming the plurality of inner pins.

12. The internal planetary gear mechanism according to claim 9, wherein
   the plurality of inner pin holes are provided at equiangular intervals for the pitch circle for forming the inner pin holes, and the plurality of inner pins are provided at equiangular intervals for the pitch circle for forming the plurality of inner pins.

13. The internal planetary gear mechanism according to claim 9, wherein
   a diameter φDhole of the inner pin hole is set equal to or larger than the sum of the amount of eccentricity α of the eccentric part and a diameter φDpin of the inner pin.

* * * * *